United States Patent [19]

Blyler, Jr. et al.

[11] Patent Number: 5,402,516
[45] Date of Patent: Mar. 28, 1995

[54] OPTICAL FIBER APPARATUS

[75] Inventors: Lee L. Blyler, Jr., Basking Ridge; Darryl L. Brownlow, Plainfield; Daryl Inniss, Hillsborough, all of N.J.; James R. Petisce, Norcross, Ga.; Lloyd Shepherd, Madison, N.J.; Carl R. Taylor, Lawrenceville, Ga.

[73] Assignee: AT&T Bell Laboratories, Murray Hill, N.J.

[21] Appl. No.: 129,628

[22] Filed: Sep. 30, 1993

[51] Int. Cl.[6] .............................................. G02B 6/00
[52] U.S. Cl. .................... 385/141; 522/96; 522/97; 385/114; 385/112; 385/106; 385/128; 385/145
[58] Field of Search ............................. 522/96, 97, 98; 385/123, 100, 102, 106, 109, 112, 114, 126, 127, 128, 141, 144, 145

[56] References Cited

U.S. PATENT DOCUMENTS

| | | | |
|---|---|---|---|
| Re. 33,459 | 11/1990 | Bohannon et al. | 350/96.23 |
| 4,514,037 | 4/1985 | Bishop et al. | 350/96.23 |
| 4,701,016 | 10/1987 | Gartside, III et al. | 350/96.23 |
| 4,900,126 | 2/1990 | Jackson et al. | 350/46.23 |
| 4,914,171 | 4/1990 | Zweig | 526/246 |
| 4,923,915 | 5/1990 | Urruti | 524/102 |
| 5,219,896 | 6/1993 | Coady et al. | 522/96 |

FOREIGN PATENT DOCUMENTS

WO91/03499  3/1991  WIPO ........................... C08F 8/30
WO91/03503  3/1991  WIPO ........................... C08F 26/02

OTHER PUBLICATIONS

"The Stabilization of UV Curable Coatings for Optical Fibers", *Plastics in Telecommunications IV*, pp. 14/1–14/9, reported at the 4th Int'l. Conf. on Plastics in Telecommunications, Sep. 17–19, 1986, London WC2, UK.

"Self–Stripping of Optical Fiber Coatings in Hydrocarbon Liquids and Cable Filling Compounds", in *Optical Engineering*, Jun. 1991, vol. 30, No. 6, starting at p. 746.

Primary Examiner—Rodney B. Bovernick
Assistant Examiner—John Ngo
Attorney, Agent, or Firm—George S. Indig

[57] ABSTRACT

Optical fiber and cable performance are assured by a category of UV-cured polyurethane acrylates. Low cost is the consequence of use of the polycarbonate oligomer. Good performance and long life are ascribed to other ingredients of the coatings. Dependence on the hindered phenols for antioxidant protection assures sufficient protection for these inherently stable materials without incurring fiber damage found to result from use of hindered amine antioxidants.

12 Claims, 2 Drawing Sheets

OPTICAL FIBER APPARATUS

FIELD OF THE INVENTION

The invention relates to optical fiber and to optical fiber cable as well as to other apparatus incorporating optical fiber.

DESCRIPTION OF THE PRIOR ART

Optical fiber continues to be the focus for development of high capacity communications systems. State-of-the-art fiber has sufficiently low insertion loss, chromatic dispersion and polarization mode dispersion to satisfy requirements for multichannel 10 gbit capability—soon to be extended to 20 gbit. The erbium amplifier permits repeaterless transoceanic operation in systems being installed. This capability, together with contemplated upgrading, leads to expected useful fiber life of decades. This has, in turn, drawn attention to long-life fiber packaging.

Manufacturing, installation, and in-use needs include protection both from physical damage and from chemical attack. Optical fiber coatings must be applied early in manufacture to preserve strength and to resist microbending. UV-curing of coating applied as the fiber is drawn protects it from damage by take-up equipment. Differing coating requirements at the coating-to-fiber interface and at the outer surface are satisfied by dual coatings. The inner or primary coating must be soft enough to buffer externally applied stresses—must have low modulus (generally specified at 50 psi to 500 psi at room temperature) corresponding with low glass transition temperatures (generally specified at $-20°$ C. to $-80°$ C.) to assure continuance of this property over the full range of anticipated operating conditions. The outer coating—the "secondary" coating—must have physical and chemical toughness, and must distribute externally applied stresses. This translates into specification requirements of high modulus (20,000 psi to 200,000 psi at room temperature) and high glass transition temperatures (35° C.-125° C.). Inherent or addition-dependent properties often include solvent resistance and low surface friction.

Glass transition temperature is the midpoint value of the temperature interval over which the coating (primary or secondary) changes from a glassy solid to a rubbery solid. Because of the viscoelastic character of polymers, the experimentally determined glass transition temperature is dependent upon the time scale of the measurement used. Glass transition temperature values may be determined by dynamic mechanical analysis (DMA) in which an approximately 125 $\mu$m thick film of the cured coating is subjected to a small oscillatory mechanical deformation in tension at a frequency of 1 radian/sec, while the temperature of the film is ramped slowly upward at approximately 1° C./min. The stress in-phase with, and 90° C.-out-of-phase with, the applied strain is determined. The ratio of the in-phase stress-to-strain amplitude defines the storage modulus; the ratio of the out-of-phase stress-to-strain amplitude defines loss modulus. The ratio of the loss modulus to storage modulus defines the loss tangent. The glass transition temperature is taken as the peak which occurs in the loss tangent as temperature is scanned through the glass transition interval. This measurement is well-known to those skilled in the art and is fully described in *Introduction to Polymer Viscoelasticity*, J. J. Aklonis, W. J. MacKnight and M. Shen, Wiley-Interscience, New York, N.Y., 1972, pp. 14-21 and 60-66.

UV curable urethane acrylates are the prevalent state-of-the-art coating materials. With variations in amount and kind of ingredients they are used both in primary and secondary coatings. The multicomponent formulation to be cured includes one or more oligomers—a molecule of moderate molecular weight, generally less than 10,000. The oligomer consists of an acrylate reactive moiety at each end of the molecule together with a hydrocarbon-based "backbone". The formulation includes one or more low molecular weight monomers to tailor modulus or glass transition temperature of the cured coating, and generally to adjust formulation viscosity.

Other coating ingredients include photoinitiators (to respond to UV radiation to create free radicals and initiate polymerization), adhesion promoters (to promote adhesion between the primary coating material and the fiber), and stabilizers. Included stabilizers serve a variety of purposes: prevention of premature polymerization (to ensure adequate shelf life); and protection of the cured polymer against deterioration in use. Polymer stabilizers serve as "thermal antioxidants" (to protect against temperature-dependent oxidative degradation). Some commonly included stabilizers, while functioning as thermal antioxidants, retain their description as "light stabilizers" based on their effectiveness in protecting against UV-initiated oxidation. Despite industry retention of this terminology, light stabilization is not usually an important consideration (e.g., for fibers enclosed within a light-blocking cable sheathing).

Considerable attention has been given to identification of suitable thermal antioxidants. U.S. Pat. No. 4,923,915, issued May 8, 1990, is representative of the present level of development. It is based on incorporation of a combination of members of two classes of antioxidants—the hindered amines and the hindered phenols. The patent teaches synergism between the two classes. The finding is consistent with an extensively supported body of information, showing the hindered phenols to be particularly effective in preventing the onset of oxidation, and the hindered amines to be particularly effective during later stages. Inclusion of these antioxidant combinations is common practice for recently formulated coatings.

Other references include "The Stabilization of UV Curable Coatings for Optical Fibers", *Plastics in Telecommunications IV*, pp. 14/1-14/9, reported at the Fourth International Conference on Plastics in Telecommunications, Sept. 17-19, 1986, London WC2, United Kingdom. PCT Patent, WO91/03503 describes a variety of primary coating compositions. Poly-carbonate-based oligomer compositions in the present description are derived from TABLES I and II in that patent. Complete coating compositions of that patent contain both hindered amine and hindered phenol antioxidants.

SUMMARY OF THE INVENTION

The invention is based on cost-competitive, coated optical fiber. Low-cost coating compositions are in all ways comparable with the best coatings previously available. In common with best prior art, coatings of the invention are UV-cured polyurethane acrylates. Inherent stability of the particular class—of the carbonates—permits use of a thermal antioxidant system which both assures adequate life, and which avoids ingredients here found to impair fiber strength. Of equal importance, the polycarbonate urethane acrylates permit use of low-cost natural, low molecular weight (mw≦500) hydrocarbon oil-containing cable filling compounds. Taken together, the two aspects yield an economical, performance-acceptable, cabled-fiber. The invention is well-suited to all forms of cables, including loose tube cables as well as cables containing cylindrical or planar groupings.

One contribution of the invention will likely be of value well beyond the claim scope. It is found that a hindered amine antioxidant—uniformly regarded as giving the best antioxidant protection as taken together with a paired hindered phenol—in the presence of moisture, attacks and impairs strength of the glass fiber itself. This is a serious consideration for most communications fiber which is seldom hermetically sealed. Strength impairment is seen both at initial stages and in use. The finding dictates exclusion of amines—including hindered amines—to content of 0.03 wt % or less, levels well below those effective for long-term thermal oxidative protection. The polycarbonate urethane acrylated coating materials of the invention depend for such protection on one or more hindered phenols. Inherent stability of the polymer permits attainment of needed life without use of amines. The penalty of lessened oxidative protection is justified by the advantage of reliably improved tensile strength.

Amine-derived strength-impairing agents are mobile in the presence of moisture. Exclusion of amines from secondary coating compositions is found to be of importance, approaching or equal to that for the primary coating. In the absence of a hermetic barrier, the same consideration applies to material at even greater distance from the fiber. An example is the matrix material used in AccuRibbon®—the planar optical array of coated fibers bonded together by a UV-curable acrylate matrix material—described in U.S. Pat. No. 4,900,126, issued Feb. 13, 1990. The inventive teaching is to exclusion of amines from any materials which form a diffusion path for water to the fiber.

The inventive coating compositions are protected against discoloration and may be used together with color identifiers in "tertiary" color coding fiber coatings. The same consideration leads to their use overlying color coding layers. Structures of the invention include one or more such coatings of such composition—for primary and/or secondary fiber coatings. The same compositions are suitably included for other purposes such as buffering or matrix materials. All coatings—all materials in direct or indirect intimate contact with the fiber—whether of such composition or not, are required to be free of amine at the level indicated.

DETAILED DESCRIPTION

Structures

Figure 1:
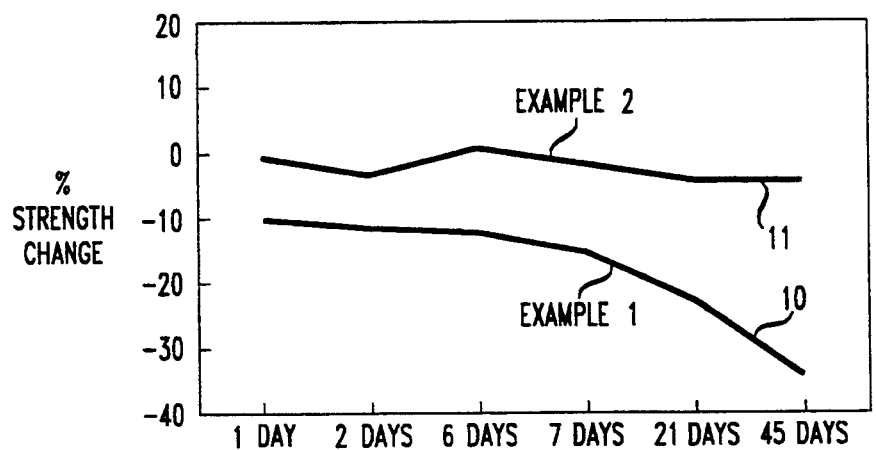
FIG. 1 on coordinates of fiber strength change and time, compares time-difference of fiber strength for stabilized polycarbonate urethane acrylate coatings with and without amine.

The figures are illustrative. Contemplated structures generally contain one or more dual-coated fibers. The first two coatings—the "primary" and "secondary" coatings—may be enclosed within a further coating. This "tertiary" coating may include color identifier to serve for color coding.

Cable structures include a plurality of such fibers, often in grouped form. One form of grouping is the planar array of FIG. 5.

All contemplated structures include at least one "coating" of a polycarbonate urethane acrylate containing one or more hindered phenol thermal antioxidants. Other coating/s may be of such a carbonate composition as well. All coatings, as well as other materials in intimate contact with coatings, whether of carbonate or not, are free of amine to a prescribed level of 0.03 wt. % or less.

Preferred structures use carbonate compositions for all fiber coatings. This is particularly desirable for cable structures using hydrocarbon oil filling compounds.

The carbonate compositions of the invention have a particular advantage dictating their preference to other tested UV-cured acrylates for use in or under color coding layers. Test results show reduced discoloration with time—in fact, reduced discoloration, and, therefore lessened color maskings, for the same degree of oxidative degradation.

Composition

Amines are avoided in compositions in direct or indirect contact with optical fiber. Affected compositions ("contacting materials") are a part of a path to the fiber, unimpeded by a hermetic layer or by any other obstacle to migration of the mobile species resulting from water contact.

The advance will find use in a well-developed class of compositions. Optical fiber coatings—primary and secondary coatings as now used—depend for thermal antioxidant protection on accepted categories of antioxidant materials. Of the two categories, dependence will continue to be had on only one—on hindered phenols. In prescribing coating formulations, members of the second class—of hindered amines—are not prohibited altogether. While preferred embodiments call for "total" exclusion (to levels ≦1 ppm in weight), small amounts at or below 0.03 wt. % may be tolerated. This provides for continued use for assuring shelf life (for avoiding premature polymerization) of the uncured material before application to the fiber. The inventive finding is directed to substantial exclusion of amines regardless of purpose. Amines, whether hindered or not, are destructive.

Initial value is primarily economic. Considered as simple fiber coatings—aside from color coding and aside from cabled fiber—at least during early life, the new coatings may not offer performance advantage over earlier coatings. The advance, in these terms, is broader. It offers cost-effective coated fiber, both cabled and uncabled.

The class of coating materials of interest are the UV-curable polycarbonate urethane acrylates. The designation of "polycarbonate" refers to the "oligomer backbone"—a primary determinant of as-cured coating properties, although playing no direct role in curing (in "polymerization" to result in the crosslinked end product).

Coating compositions using carbonate oligomers are well-known. The particular class of the polycarbonates is described in detail both in the patent literature and in the technical literature. The overall composition is described:

Oligomer

A preferred structure may be derived from PCT patent WO91/03499, bearing international publication date of 21 Mar. 1991.

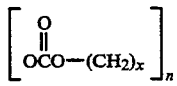

This "backbone" precursor or "prepolymer" is a diol. The oligomer is completed by bounding diisocyanate groupings, and, finally, by terminal acrylate groupings. The terminal groupings are generally monohydric, e.g., hydroxyethyl acrylate. The diisocyanate groupings contain the urethane from which the class of materials takes it name. Permitted variations are known. A number of chemical changes may be made without affecting the advance. Methacrylate groupings may replace acrylate groupings, O may be replaced by N or S, etc.

Antioxidants

It is the thrust of the invention that long-term antioxidant protection of the cured coating composition is entirely due to hindered phenols. Inclusion is likely to be in the 0.25 to 2.0% range. Examples of hindered phenols in use are octadecyl 3,5 di-tert-butyl-4-hydroxyhydrocinnamate, thiodiethylene bis (3,5-di-tert-butyl-4-hydroxy)-hydrocinnamate, and tetrakis [methylene (3,5-di-tert-butyl-4-hydroxyhydrocinnamate)] methane. Suitable antioxidant chemical compositions may function to prevent premature polymerization. Amount of this inclusion is at least an order of magnitude lower than that of antioxidant content. The low permitted limit of 0.03 wt. % for amine inclusion is designed to provide for small amounts of amine shelf stabilizer as sometimes used in practice. Preferred compositions exclude even such minor amounts—restrict amine inclusion to 1 ppm or less.

Other Ingredients

The cited PCT patent contains an excellent description of coating compositions in use (pp. 2-15). Specific compositions described in the tables are for primary coatings. Additive categories are the same for secondary compositions (although amount and kind vary in accordance with preferred end characteristics). Compositions of this class—based on polycarbonate backbone—but primarily designed for use in secondary (or outer) fiber coatings—are also well-known. U.S. Pat. No. 4,514,037, issued Apr. 30, 1985, considers such materials and includes specific examples providing for additives together with the oligomer, all as directed to obtaining the high modulus, high glass transition temperature characteristics needed for this purpose.

Additives include photoinitiators, generally an amount of from 1-5%. Inclusion is significant in assuring rapid cure time to avoid fiber damage inflicted by contacting sheaves, guides and capstans during drawing. For in-line coating of optical fiber, curing of both primary and secondary coatings, whether simultaneous or sequential, must be essentially complete in one or a few seconds. Adhesion promoters are included in the primary composition to assure coating-to-glass adhesion. They are needed to avoid delamination (caused by damage resulting from rough handling or by aging) which impairs fiber reliability. Other additives contain functional groupings—are primarily monofunctional and polyfunctional acrylates. These enter into the polymerization process and help to determine physical characteristics of the cured coatings.

The description is generally applicable to primary and secondary coating compositions, as well as to other included uses. To some extent, final properties tailored to these uses, depend on oligomer compositions themselves. Primary coating compositions are desirably of low glass transition, from $-20°$ C. to $-80°$ C. (generally about $-40°$ C.), which, in the relevant compositions, corresponds with a low modulus at room temperature, from (50 to 500 psi). Outer coatings, e.g. secondary or tertiary coatings, are of greater toughness; have higher glass transition temperature ($50°$ C.-$125°$ C.) and higher modulus (20 to 200 kpsi at room temperature).

Filling Compounds

Figure 3:
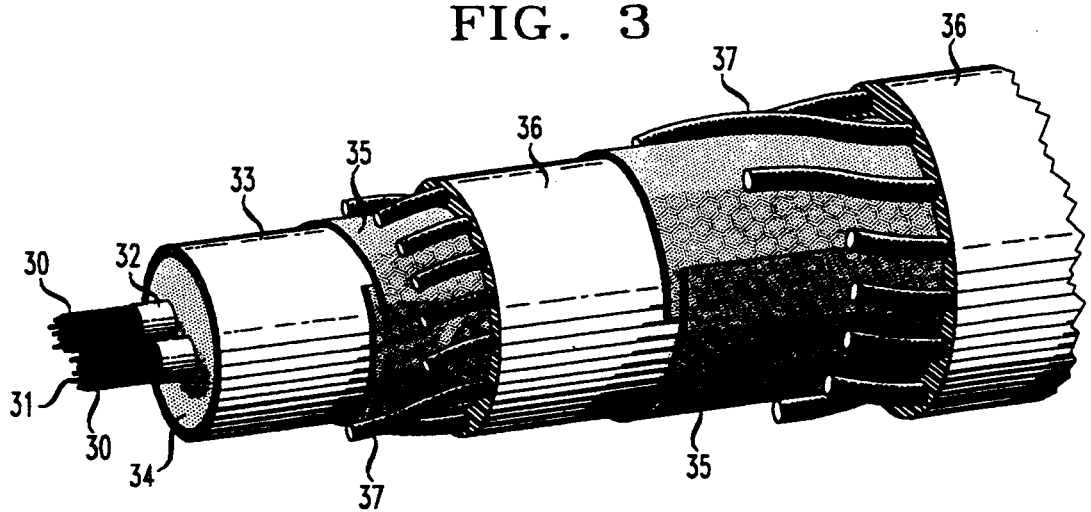
FIG. 3 is a perspective view of a filled cable structure containing grouped fibers.
Figure 5:
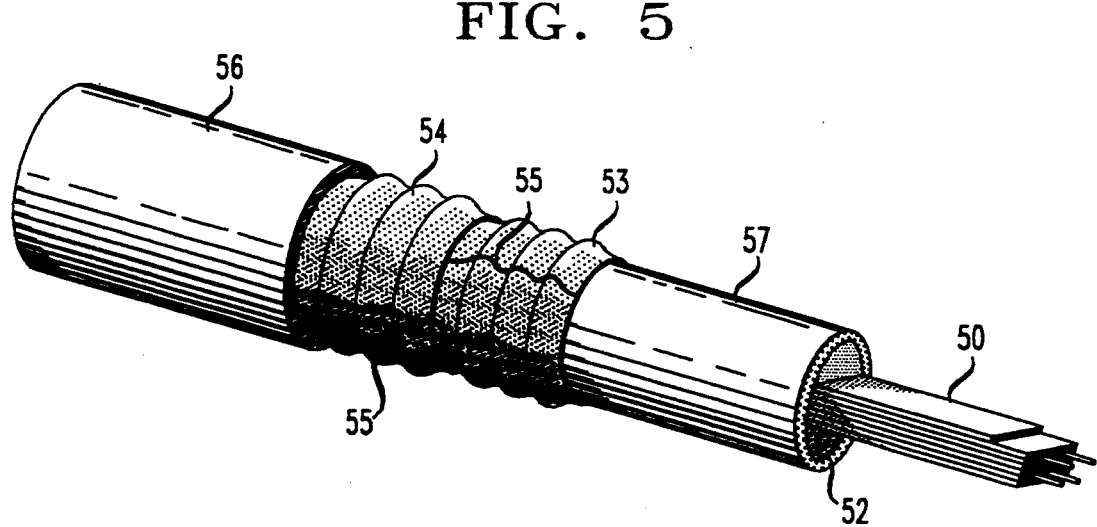
FIG. 5 is a perspective view of a filled cable structure containing fiber arrays of the type shown in FIG. 4.

A prime implication of the invention concerns cable structures using a particular class of filling compounds. A technical article "Self-stripping of Optical Fiber Coatings in Hydrocarbon Liquids and Cable Filling Compounds", in *Optical Engineering*, June 1991, vol. 30, No. 6, starting at p. 749 is relevant. Observing attack on fiber coatings by hydrocarbon oil cable filling compounds, the authors develop an analytical procedure for quantitative measure of coating-to-filler compatibility. A useful class of hydrocarbon oil filling compounds is described in U.S. Pat. No. 4,701,016, issued Oct. 20, 1987. Representative cable structures are shown in FIG. 3 and FIG. 5.

Hydrocarbon oil filling compounds which may be used with polycarbonate urethane acrylates are of the general class of greases and gels which consist of naturally-occurring hydrocarbon oils of viscosity less than 20 centipoise at $25°$ C. and which are thickened or gelled by the incorporation of polymers and/or fillers.

The Drawing

FIG. 1 plots accelerated life-test data points for two fibers. Fiber coatings are of similar dimensions and compositions, but contain different thermal antioxidant systems: Curve 10 is for a coating containing both hindered phenol and hindered amine stabilizers whereas curve 11 is for a coating of a formulation of the invention—containing only hindered phenol for antioxidant protection. Coordinates are strength change, in kpsi, on the ordinate and time, in days, on the abscissa. The strength tests were carried out on the fibers aged at $85°$ C. and 85% relative humidity. According to the Fiber Optic Test Procedure outlined in the Electronic Industries Association (EIA) EIA-455 FOTP-76, using a gauge length of 50 cm and a strain rate of 2.5% per minute. The samples were conditioned and tested at $23°$ C. and 50% relative humidity. Both fibers showed initial strength of 650-675 kpsi (corresponding with 0% strength change on the ordinate). The amine-containing sample of curve 10 exceeded 25% strength loss when tested after 10 days. The fiber sample coated with the amine-free composition showed only insignificant strength loss over the entire 30-day test period. Strength-to-fracture was measured for five samples after the periods shown. Those at 30 days were used in examples 1 and 2. Results were confirmed for other coating compositions. Similar results are obtained for representative members of the general class of hindered phenols.

Figure 2:
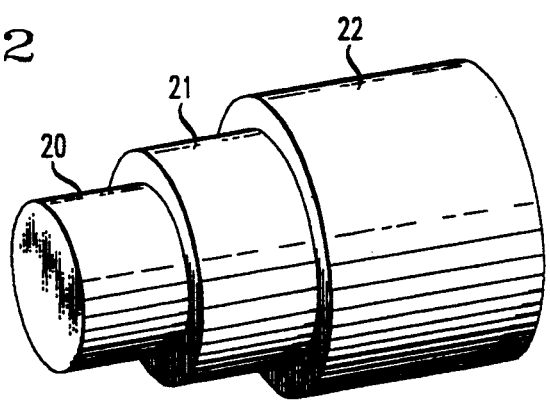
FIG. 2 shows is a perspective view of a dual coated single fiber.

FIG. 2 depicts a conventional fiber 20 as coated by primary coating 21 and secondary coating 22. In present practice fiber 20 is primarily silica and has a diameter of about 125 μm. Currently manufactured fiber is generally based at least in part on a vapor deposition method. Most fiber is made by "soot" chemistry by which a vaporized silicon-containing compound is reacted to produce hydrated silica particles which are deposited on a substrate, thereafter to be dehydrated and consolidated. The alternate process, Modified Chemical Vapor Deposition, (MCVD) is similar but provides for reaction in a hydrogen-free environment. Commercial practice provides for a low-cost overcladding, enclosing the soot or MCVD preform core which is then drawn to produce the fiber. Coatings 21 and 22 are generally of about equal thickness—within a range of from 10 to 40 μm; with thinner coatings being used for high fiber count cable.

FIG. 3 depicts a filled cable structure showing two contained bundles 30 each of twelve color-coded fibers 31 held together by a helically wrapped, color coded, binder yarn 32. Bundles are contained within core tube 33 which is filled by filling compound 34. The filled tube, as protected by water blocking tape 35 is, in turn, enclosed within polyethylene jacket 36 which is reinforced by steel wires 37. The particular structure shown includes a second protective layer of blocking tape 35 and outer reinforced polyethylene jacket 36. Individual coated fibers 31 are of the color-coded structure of FIG. 6.

Figure 4:
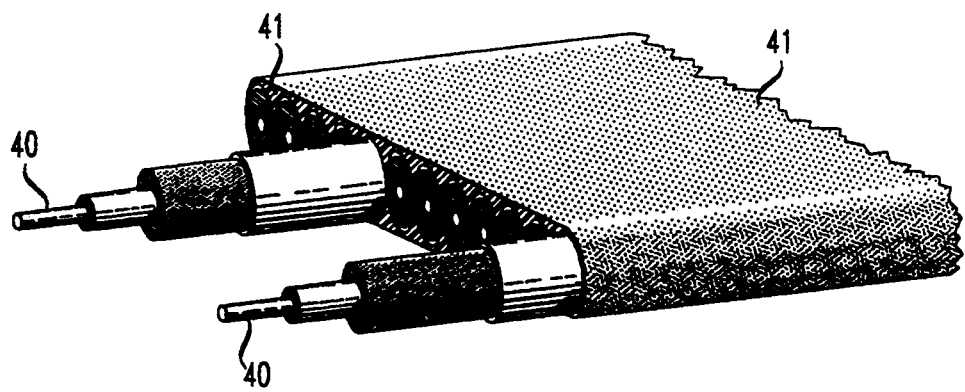
FIG. 4 is a perspective view of a fiber array.
Figure 6:
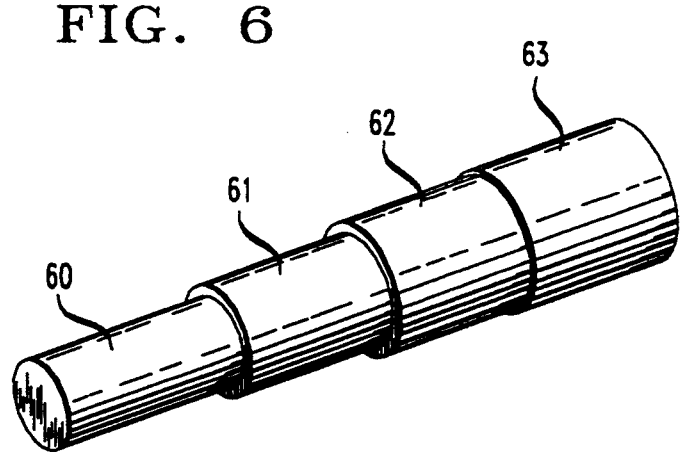
FIG. 6 is a perspective view of a dual-coated fiber with a tertiary color coding coating.

The bonded array of FIG. 4 consists of 12 coated fibers 40, each of the structure of FIG. 6. Material 41, also UV-cured, the matrix bonding material, is of relatively low modulus—having a value somewhat less than that of the secondary fiber coating and more than that of the primary fiber coating e.g., 5000 to 20,000 psi at room temperature. This material is amine-free (as are all materials in direct or indirect intimate contact with the fiber) in accordance with the specifications of this teaching. The twelve-fiber structure of FIG. 4 is illustrative of a common commercial form of AccuRibbon ®. The planar fiber array is described in U.S. Pat. No. 4,900,126, issued Feb. 13, 1990.

The cable of FIG. 5 contains a number of planar fiber array 50 "ribbons" within cross-ply sheath 51, again filled with cable filling compound 52. As discussed elsewhere, use of any of a variety of hydrocarbon oil filling compounds, tolerated by polycarbonate compositions of the invention, constitutes an economy. The particular structure shown includes overwrappings constituting conductive shield 53, a coated stainless steel protection layer 54 with overlap seams 55, and finally a bonded polyethylene jacket 56. Both the cable of this figure and that of FIG. 3 are in commercial use. Similar structures are described in U.S. Pat. No. 33,459, issued Nov. 27, 1990.

The fiber structure of FIG. 6 is similar to that of FIG. 2 but includes an additional or "tertiary" UV-cured coating—this time carrying suitable ink for colorc-coding. The structure consists of fiber 60, primary coating 61, secondary coating 62 and tertiary coating 63. In preferred structures all three coatings are polycarbonate urethane acrylates of the invention. Color coatings are conventionally used, e.g., in commercially available structures of both FIGS. 3 and 5. For production economy and versatility, it is useful to introduce color via a separate coating layer.

Experimental Method

Procedures used in preparation of data plotted in FIG. 1 as well as that of numbered examples is described.

A. The Fiber

Detailed description is not appropriate. Familiar fiber fabrication was used. The preform consisted of an overcladding encompassing an MCVD core rod. Following collapse, the fiber was drawn to produce a usual transmission grade fiber. It consisted of a single mode Ge up-doped core which, together with cladding, had an OD of 125 μm.

B. The Coating

Primary and secondary coatings each of approximately 30 μm thickness were applied by passing the fiber through a dual coating applicator. Exposure to typical production doses of ultraviolet radiation produced well-cured coatings prior to take-up.

C. Strength Test

Strength testing was carried out in accordance with an Electronic Industries Association (EIA) Fiber Optic Test Procedure (FOTP) designated EIA-455 FOTP-76, "Dynamic Fatigue in Tension." The fiber specimens were tensile tested to failure in 50 cm gauge lengths at a rate of 2.5% min$^{-1}$ at 23° C., 50% RH. Fifteen replicate specimens were tested for each strength determination and the median value was taken as the reported strength.

D. Test Variations.

Adequate test data was developed to support the disclosure. Except for Example 1, numbered examples relate to fibers coated with compositions stabilized by hindered phenol antioxidants. Examples 1 and 2 directly compare similar fibers of the structure of FIG. 2 in which the critical difference is presence/absence of hindered amine in both primary and secondary coatings. Other examples vary in amount and kind of additives—e.g., monofunctional acrylates which enter into the polymerization reaction and tailoring modulus and $T_g$. Other additives, conventionally included, were the photoinitiators and adhesion promoters. Examples show continuance of retained fiber strength in all such compositions.

EXAMPLE 1

This example, taken from the 30-day data point of curve 10, refers to the structure of FIG. 2 in which the fiber is encompassed by primary and secondary coatings, each of ≈30 μm thickness. Coatings, in every instance as described under "Composition", were altered by chosen amount and kind of additives to produce measured modulus and $T_g$: primary coating, 150 psi at room temperature, $T_g$ −40° C.; secondary coating, 120 kpsi at room temperature, $T_g$ 40° C. Thermal antioxidant protection depended upon a hindered phenolic antioxidant together with a hindered amine light stabilizer. As reported, the 30-day fracture strength was 470 kpsi—representing a >25% strength loss.

EXAMPLE 2

This example, taken from the 30-day data point of curve 11 was of the same structure, coated by the same thicknesses of polycarbonate urethane acrylates based on the same oligomer and co-polymerization inclusions as for the corresponding primary and secondary coatings of Example 1. The critical difference between this and the prior example was in the thermal antioxidant system. Protection depended solely on the same amount of the same hindered phenol as in Example 1, but without the hindered amine of Example 1. The 30-day fracture strength was, within measurement tolerance, substantially unchanged (within 3%) from the initial value.

EXAMPLE 3

Film samples of polycarbonate urethane acrylate compositions comprising primary and secondary coatings were cured with a Fusion Systems, Inc. Model F450 UV Lamp incorporating a "D" Bulb. The UV-dose employed was 0.75 J/cm$^2$ as measured with an International Light IL 390 Light Bug.

In the case of the primary coatings, two ~250 μm thick films were prepared by drawing the liquid materials on a quartz plate with a doctor blade. The primary coating films differed in composition only in the presence (P-1) or absence of (P-0) of wt 1% hindered amine light stabilizer. Both primary coatings contained 1% wt hindered phenolic antioxidant. The secondary coating films were similarly prepared, but had ~150 μm thickness. Again two films were prepared, one having no hindered amine light stabilizer (S-0), the other having 1% wt hindered light stabilizer (S-1). Both films contained 1% wt hindered phenolic antioxidant.

Samples were cut from these films which approximately covered the bottoms of the aluminum sample pans used with a differential scanning calorimeter (DSC). The sample weights were approximately 5 mg each.

The sample pans containing the sample films were placed individually in a TA Instruments Model 2100 Thermal Analyzer equipped with a Model 912 Cell Base. At the time of loading of each sample, the cell was held at 50°–55° C. and purged with nitrogen. After loading, each sample in its sample pan was heated to 60° C. and equilibrated for 5 min. The nitrogen purge was then switched to an oxygen purge at 100 cc/min and the sample was heated from 60° C. to 300° C. at a linear ramp rate of 10° C./min.

A thermogram of heat flow vs. temperature was obtained for each sample. When each sample began to oxidize, a rapid evolution of heat occurred, causing the heat flow curve to change in slope. The curve beyond the slope change (where rapid oxidation occurred) was extrapolated to the extension of the baseline prior to the slope change, where little or no oxidation occurred. The temperature at the point of intersection, known as the extrapolated onset of oxidation (EOO), was obtained for each sample. Two replicate samples were run for each film and the EOO values were averaged from the two measurements.

In the case of the primary coatings the EOO values were 249° C. for P-0 and 258° C. for P-1. In the case of the secondary coatings the EOO values were 267° C. for S-0 and 274° C. for S-1. These results indicate that the addition of 1% wt hindered amine light stabilizer to a primary or secondary polycarbonate urethane acrylate coating which contains 1% wt hindered phenolic antioxidant increases the EOO by less than 10° C. Furthermore, EOO values of approximately 250° C. or greater are considered to represent excellent oxidative stability. Consequently, the hindered amine light stabilizer may be eliminated from polycarbonate urethane acrylate coating formulations which are protected with suitable hindered phenolic antioxidants without significant adverse effect.

We claim:

1. Apparatus comprising a high silica glass body as a part of an optical fiber transmission path, the apparatus including at least one protective region for the body, in which the protective region consists primarily of a cured urethane acrylate-containing composition, yielded by UV-curing a mixture of a urethane acrylate oligomer together with additives including: at least one first additive which co-polymerizes with the oligomer; at least one second additive serving as polymerization initiator; and at least one third additive serving as thermal antioxidant; and in which the protective region is in direct or indirect contact with the body in which direct or indirect contact is defined as sufficient to permit water to diffuse through the protective region to the body, characterized in that the UV-curing oligomer is a carbonate urethane acrylate, in that every third additive is a hindered phenol, in that total amine content of the composition is a maximum of 0.03 wt. %, and further in that total amine content of any material in direct or indirect intimate contact with the composition is a maximum of 0.03 wt. %.

2. Apparatus of claim 1 in which the high silica glass body is an optical fiber, in which the protective region is a fiber coating, and in which total thermal antioxidant content of the coating is at least 0.25 wt. %.

3. Apparatus of claim 2 in which the fiber coating is a primary coating in intimate contact with the fiber.

4. Apparatus of claim 2 including at least first and second protective regions consisting of first and second compositions, each composition being as defined in claim 1 but in which the compositions need not be identical.

5. Apparatus of claim 4 in which first and second protective regions constitute primary and secondary fiber coatings.

6. Apparatus of claim 5 including at least a tertiary coating of a composition defined in accordance with claim 1.

7. Apparatus of claim 6 in which the tertiary coating is a color coding coating.

8. Apparatus of claim 5 including a plurality of fibers within a cable structure containing a hydrocarbon oil filling compound in contact with a protective region.

9. Apparatus of claim 8 in which at least some fibers include a tertiary coating consisting essentially of a composition as defined in claim 1, the tertiary coating serving as a color coding coating.

10. Apparatus of claim 8 in which fibers are grouped together to yield at least two separate groups, each group containing a plurality of fibers.

11. Apparatus of claim 10 in which each of at least two groups is a parallel fiber array.

12. Apparatus of claim 11 in which each fiber array includes a matrix bonding material consisting essentially of a composition as defined in claim 1 filling interstices of the array.

* * * * *